United States Patent
Du et al.

(10) Patent No.: US 12,488,434 B2
(45) Date of Patent: Dec. 2, 2025

(54) COMPUTATIONAL PHOTOGRAPHY FEATURES WITH DEPTH

(71) Applicant: Google LLC, Mountain View, CA (US)

(72) Inventors: Ruofei Du, San Francisco, CA (US); David Kim, Zug (CH)

(73) Assignee: GOOGLE LLC, Mountain View, CA (US)

( * ) Notice: Subject to any disclaimer, the term of this patent is extended or adjusted under 35 U.S.C. 154(b) by 381 days.

(21) Appl. No.: 17/756,700

(22) PCT Filed: May 26, 2020

(86) PCT No.: PCT/US2020/070075
§ 371 (c)(1),
(2) Date: May 31, 2022

(87) PCT Pub. No.: WO2021/242326
PCT Pub. Date: Dec. 2, 2021

(65) Prior Publication Data
US 2022/0414834 A1    Dec. 29, 2022

(51) Int. Cl.
*G06T 5/70* (2024.01)
*G06T 7/13* (2017.01)
*G06T 7/50* (2017.01)

(52) U.S. Cl.
CPC ............... *G06T 5/70* (2024.01); *G06T 7/13* (2017.01); *G06T 7/50* (2017.01)

(58) Field of Classification Search
CPC .... G06T 5/70; G06T 7/13; G06T 7/50; G06T 2200/24; G06T 2219/2012; G06T 19/20; G06T 11/60
See application file for complete search history.

(56) References Cited

U.S. PATENT DOCUMENTS

| | | | |
|---|---|---|---|
| 2011/0150321 A1* | 6/2011 | Cheong | G06T 7/12 382/154 |
| 2014/0267618 A1 | 9/2014 | Esteban et al. | |
| 2015/0022649 A1 | 1/2015 | Koppal | |
| 2019/0304112 A1* | 10/2019 | Hota | H04N 13/128 |

FOREIGN PATENT DOCUMENTS

| | | |
|---|---|---|
| JP | 2008021163 A | 1/2008 |
| JP | 2015079519 A | 4/2015 |
| JP | 2016208522 A | 12/2016 |
| JP | 2018029270 A | 2/2018 |
| KR | 20110054196 A | 5/2011 |
| KR | 20190118531 A | 10/2019 |
| WO | 2018214067 A1 | 11/2018 |

OTHER PUBLICATIONS

International Search Report and Written Opinion for PCT Application No. PCT/US2020/070075, mailed on Dec. 23, 2020, 11 pages.
Office Action for Korean Application No. 10-2022-7026024 (with English translation), mailed Mar. 22, 2024, 15 pages.

* cited by examiner

*Primary Examiner* — Qian Yang
(74) *Attorney, Agent, or Firm* — Brake Hughes Bellermann LLP (57) ABSTRACT

A method including receiving an image as a portion of a real-world space, placing an anchor on the image, determining a position of the anchor, determine a depth associated with the position of the anchor, applying an image editing algorithm based on the depth to the captured image, and rendering the edited image.

20 Claims, 6 Drawing Sheets

COMPUTATIONAL PHOTOGRAPHY FEATURES WITH DEPTH

CROSS-REFERENCE TO RELATED APPLICATION

This application is a 35 U.S.C. § 371 National Phase Entry Application from PCT/US2020/070075, filed on May 26, 2020, entitled "COMPUTATIONAL PHOTOGRAPHY FEATURES WITH DEPTH", the disclosure of which is incorporated herein by reference in its entirety.

FIELD

Embodiments relate to digital photography image editing.

BACKGROUND

Computational photography in mobile devices includes enhancing the visual appearance of images by applying screen-space enhancements, filters, and/or the like and/or blurring, changing, and/or the like of the background using machine-learning-based segmentation. For example, a filter can be applied to the screen-space to modify the coloring (e.g., change blues, change to grey scale, brighten colors, and/or the like). In another example, a learned algorithm can distinguish a human from a background in a screen-space and cause the background to blur (or insert a different background). In another example, a background can be blurred based on depth where a first portion of an image is a foreground and a second portion of the image is a background. In other words, a depth $d_0$ is identified and depths $d_f$ that are less than $d_0$ are the foreground and depths $d_b$ that are greater than $d_0$ are the background. Then, the entire background portion (depths $d_b$) of the image is blurred, whereas the entire foreground portion (depths $d_f$) of the image is left as is.

SUMMARY

In a general aspect, a device, a system, a non-transitory computer-readable medium (having stored thereon computer executable program code which can be executed on a computer system), and/or a method can perform a process with a method including receiving an image as a portion of a real-world space, placing an anchor on the image, determining a position of the anchor, determine a depth associated with the position of the anchor, applying an image editing algorithm based on the depth to the captured image, and rendering the edited image.

Implementations can include one or more of the following features. For example, the captured image can be a live image, the rendering of which is continually modified using the image editing algorithm based on the depth. The anchor can place a focus at a depth in the captured image, a perspective of the captured image can be changed, and the focus can remain on the depth. The applying of the image editing algorithm based on the depth to the captured image can include applying a first algorithm to a first portion of pixels including pixels of the captured image within a threshold distance of the depth, and applying a second algorithm to a second portion of pixels including the remaining pixels of the captured image.

For example, the applying of the image editing algorithm based on the depth to the captured image can include determining an object associated with the image, determine an edge of the object based on the depth, applying a first algorithm to a first portion of pixels including pixels of the captured image associated with the edge of the object, and applying a second algorithm to a second portion of pixels including the remaining pixels of the captured image. The determining of the depth associated with the position of the anchor can include acquiring a depth map associated with the captured image.

For example, the determining of the depth associated with the position of the anchor can include acquiring a depth map associated with the captured image, determining a minimum depth value associated with the captured image, determining a maximum depth value associated with the captured image, normalizing the depth map based on the minimum depth value and the maximum depth value, and determining the depth associated with the position as a normalized depth value. The determining of the depth associated with the position of the anchor includes acquiring layered depth associated with the captured image, and the depth of the anchor has a depth index number. The method or system can further include selecting an imaging editing tool, wherein the image editing tool corresponds to the image editing algorithm.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

With techniques described herein, depth maps and/or depth layers can be used to create new options for computational photography. Computational photography with depth features can improve a user experience by enabling image manipulation at an identified depth. For example, computational photography with depth features can enable pixel enhancement at a depth of interest and can enable pixel distortion at other depths to allow the user to place enhanced focus on elements of the image at the depth of interest. Depth can be a distance from a reference point. Depth can be distance and direction from a reference point. Each pixel in an image can have a depth. Therefore, each pixel in the image can have an associated distance (and optionally a direction) from a reference point. The reference point can be based on a position of a device (e.g., a mobile device, a tablet, a camera, and/or the like) including a camera. The reference point can be based on a global position (using, e.g., a global positioning system (GPS) of the device.

In an example implementation, an anchor or a virtual anchor can be placed and/or locked in the screen-space (e.g., within an image displayed on a device) for use with a depth of field calculation. The anchor can aid with the making of a video while fixing the focus point to a depth in a real-world space (e.g., the user's environment). While the device moves (e.g., changes a perspective) in the real-world space, a depth of view with respect to the device can be tracked in the real-world space using, for example, device sensors and an application programming interface (API) configured to track the depth from the device using the sensors. In other words, the anchor can be locked to a depth and as the device moves the depth can be tracked (not, for example, maintaining a fixed focal distance). For example, if the marker is placed at a depth of six (6) meters (not necessarily on an object at six (6) meters) and the device is moved to five (5) meters (e.g., a user of the device steps forward), the depth of the marker changes to five (5) meters as the device moves. Contrast this with object tracking where focus is locked on an object and as the object moves (or the device moves) the focus remains with the object so long as the object is within view. In some implementations, tracking can be a function included in an augmented reality API.

For example, the user can take a video of an object in their environment and apply an image effect (e.g., enhancement) at a depth (e.g., not necessarily on an object). To apply the image effect the user can touch the depth (on a touchscreen display of the device taking the video) to place an anchor at the depth in the real-world space (as displayed on the device or in the screen-space). Then, once the anchor is placed, the user can walk around in their environment, and the focus point will stay at the anchored depth. In an example implementation, the user can move (e.g., change perspective) around and even look away and the focus point can stay at the depth. Further, multiple such anchor points can be used (e.g., placed in the screen-space).

In this example, an object can be (but not necessarily) at the depth of the anchor enabling a new object tracking technique. Depth tracking is an improvement over current techniques for object tracking because when an object is a focal point in a screen-space using current techniques, a user focuses on the object to, for example, take a picture(s) of the object. When the user moves to another perspective to take another picture, currently, the camera uses an object recognition algorithm (or an acoustic auto-sensor) to focus again on the object. Using an object recognition algorithm has a number of disadvantages including distinguishing between two of the same objects, not refocusing when the object is no longer in view and/or comes back into view, requires a fast processor (or uses a great deal of processing resources), the need for specialized sensors, and/or the like. By contrast, example implementations can retain the location and the depth of the object (e.g., in three-dimensions) and can maintain the same focal point. In some implementations, tracking can include using object recognition and depth tracking.

In this description, a screen-space can be the visual area of an image as shown on a display of a device (e.g., a mobile device). A real-world space can be the visual environment in which the device is operating (e.g., capturing video). A view-space can be a visual area of a rendered image (e.g., can be the same or a different visual area than the screen-space).

Figure 1:
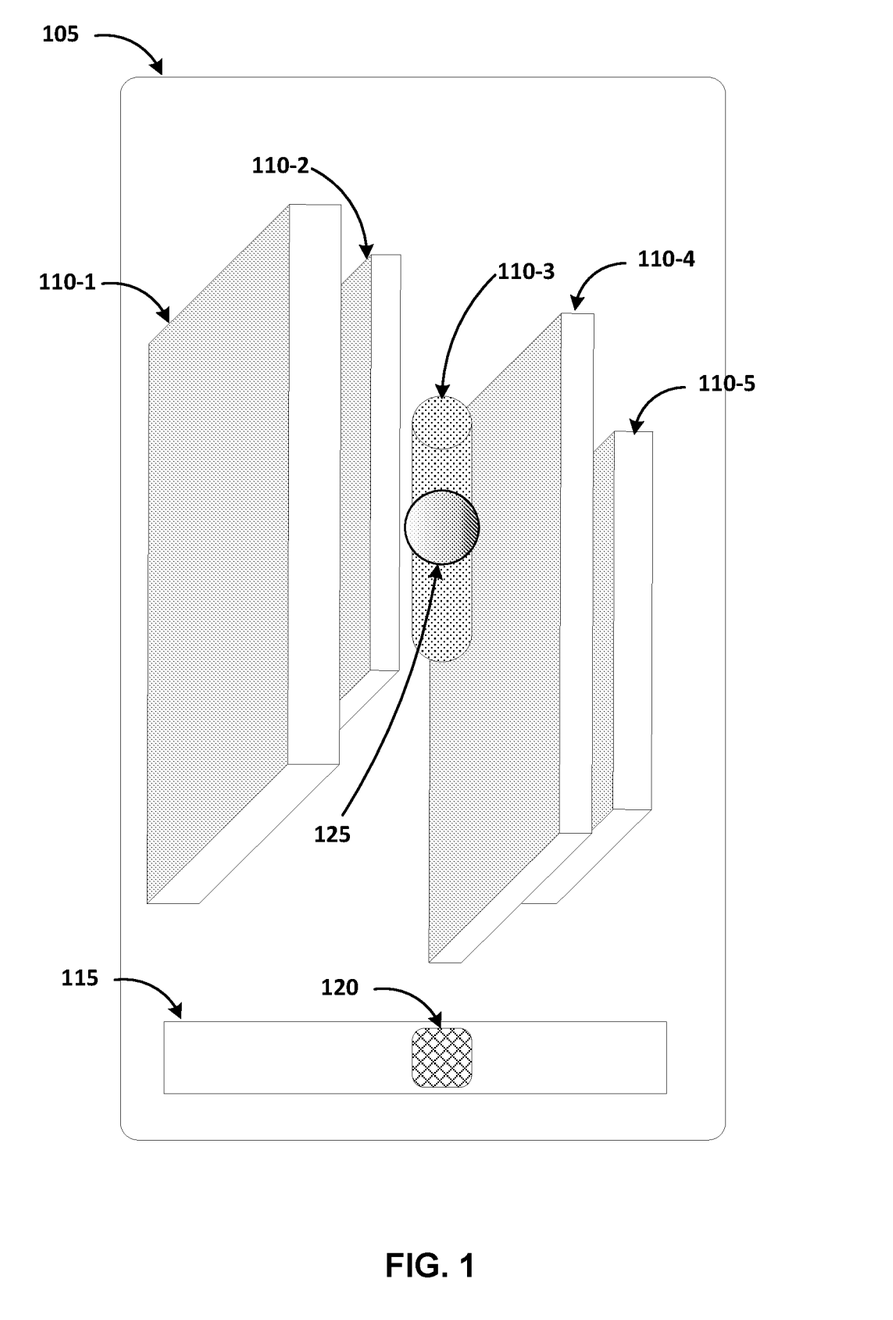
FIG. 1 illustrates a block diagram of a portion of a user interface according to at least one example embodiment.

FIG. 1 illustrates a block diagram of a portion of a user interface according to at least one example embodiment. As shown in FIG. 1, an interface 105 includes a plurality of objects 110-1, 110-2, 110-3, 110-4, 110-5, a slide bar 115, and an anchor 125. The slide bar 115 includes a slider 120. The anchor 125 can be configured to identify a depth associated with a processing action (e.g., enhancement, filter, fog, blur, and/or the like). The slide bar 115 can be configured to control the processing action (e.g., an amount of blur, an amount of fog, and/or the like).

In an example implementation, the interface 105 can be a portion of a user interface of an image (or video, or frame of a video) processing application. The anchor 125 can be placed (e.g., using a touch screen action, a mouse action, and/or the like) on an object (e.g., object 110-3) causing a depth determination and/or at a depth of the image including the objects 110-1, 110-2, 110-3, 110-4, 110-5, with each of the objects being at a different depth in the image and/or two or more of the objects being at a same depth. The image can include depth information as captured by a camera (e.g., the camera can be an RGBD sensor) and/or determined based on the image (e.g., using a depth-from motion algorithm that creates a depth map). In other words, the image can have an associated depth map identifying the depth of each pixel in the image. Identifying the depth of each pixel can enable (or help in) determining a relative depth for each of the objects 110-1, 110-2, 110-3, 110-4, 110-5.

A user of a device including the interface can select an image processing action to be performed based on the depth associated with anchor 125. For example, pixels at the depth (or within a range of the depth) of the anchor can be enhanced (e.g., a quality improved) and pixels not at the depth (or within a range of the depth) of the anchor can be manipulated (e.g., distorted, blurred, fogged, and/or the like). The slide bar can be used (by the user) to control a level of, for example, distortion and/or the range of the depth. The depth can be the depth associated with pixels (e.g., of a depth map) of the selected object and/or a layer (e.g., a z-layer) of the selected object.

Figure 2:
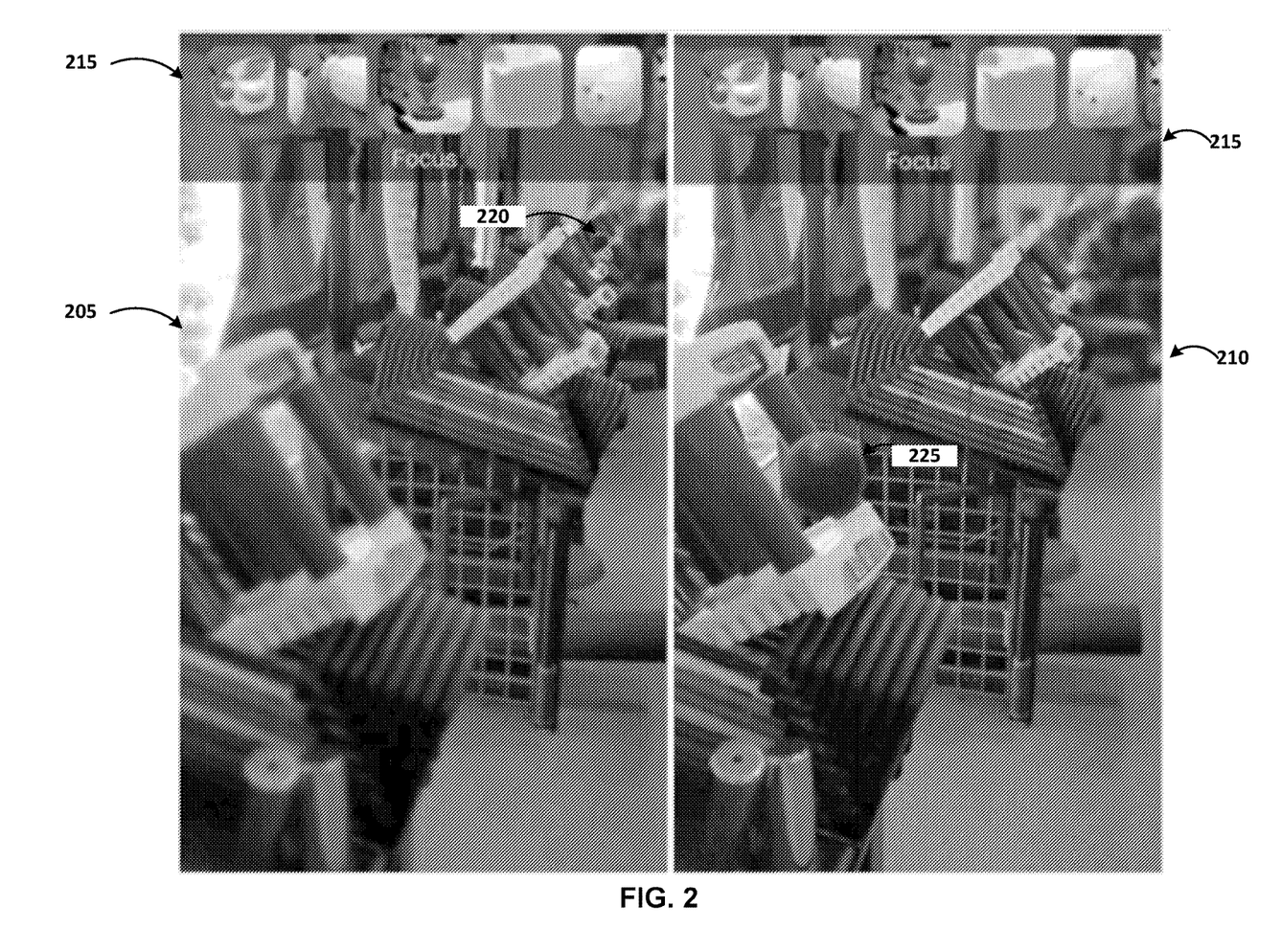
FIG. 2 illustrates a pictorial representation of a portion of a user interface according to at least one example embodiment.

FIG. 2 illustrates a pictorial representation of a portion of a user interface according to at least one example embodiment. As shown in FIG. 2, a portion of a user interface includes an image in a first state 205, the image in a second state 210, a selection tool 215, an anchor (illustrated as a ball) in a first position 220, and the anchor (illustrated as a ball) in a second position 225. The selection tool 215 is configured to select an imaging editing tool (e.g., a processing action, enhance, focus, distortion, blur, fog, filter, and/or the like). As shown in FIG. 2, the selection tool 215 has been used (e.g., via a touch screen or swipe) to select focus as the processing action.

The image in a first state 205 shows the anchor in the first position 220. The anchor in the first position 220 causes the image in the first state 205 to have a focus (as selected by the selection tool 215) that is deep or far away in the image. As is shown in the image in the first state 205, an object(s) (gym equipment) far away is in focus whereas close objects are blurry. As is shown in the image in the second state 210, an object(s) (gym equipment) that is close is focused whereas the further away objects are blurry. In an example implementation, changing a position of the anchor from the first position 220 to the second position 225 causes pixel manipulation (e.g., focusing and blurring) at different depths. This pixel manipulation is sometimes called depth-of-field effects.

In an example implementation, a portion of a real-world space is previewed on a device (e.g., a display, a viewfinder, and/or the like) as an image or a screen-space image. A user of the device can place at least one anchor on the image (e.g., using a touchscreen of the device). The device can be configured to determine a position (e.g., a coordinate (x, y) in the screen-space) of the anchor and a depth associated with the position (and therefore the anchor). For example, the depth can be based on a depth of pixels (e.g., using a depth map) at the anchor position. An image editing algorithm based on the depth can be applied to the previewed image. The edited image can be rendered on the display of the device. The previewed image can be a live image, the rendering of which is continually modified using the image editing algorithm based on the depth. As the anchor is moved from the first position 220 to the second position 225 triggering a depth determination (e.g., using a position on a depth map) and triggering a change in focus based on the determined depth.

In another implementation, the image in the first state 205 is a captured image being displayed using an application on the device. As the anchor is moved from the first position 220 to the second position 225 a depth determination (e.g., using a position on a depth map) is made triggering an image editing process. The image editing process can cause an image enhancement algorithm to be implemented on pixels at the determined depth (or within a range of the determined depth) and an image blur algorithm to be implemented on pixels not at the determined depth (or not within a range of the determined depth). The image blur algorithm can vary blurring based on depth. For example, the further away from the determined depth, the more the blur applied.

In another implementation, the image is a captured image having high resolution at all depths. The high resolution captured image can be displayed using an application on the device. The anchor can be placed at the first position 220 causing a depth determination (e.g., using a position on a depth map) to be made (e.g., by the application) triggering an image editing process. The image editing process can be an image blur algorithm implemented on pixels not at the determined depth (or not within a range of the determined depth). The image blur algorithm can vary blurring based on depth. For example, the further away from the determined depth, the more the blur applied. As the anchor is moved from the first position 220 to the second position 225 a new depth determination (e.g., using a position on a depth map) is made triggering another image editing process. The image editing process can cause a blur removal process to be implemented on pixels at the determined depth (or within a range of the determined depth) or reprocessing on the original image, and an image blur algorithm to be implemented on pixels not at the determined depth (or not within a range of the determined depth). The image blur algorithm can vary blurring based on depth. For example, the further away from the determined depth, the more the blur applied.

In an example implementation, the image editing includes editing pixels as shown in Table 1 where $d_0$ is the determined depth and D is a depth of a pixel. The example of table 1 illustrates a focus/blur editing process.

TABLE 1

| | |
|---|---|
| $D < d_0$ | blur |
| $d_0$ | focus |
| $D > d_0$ | blur |

Figure 3:
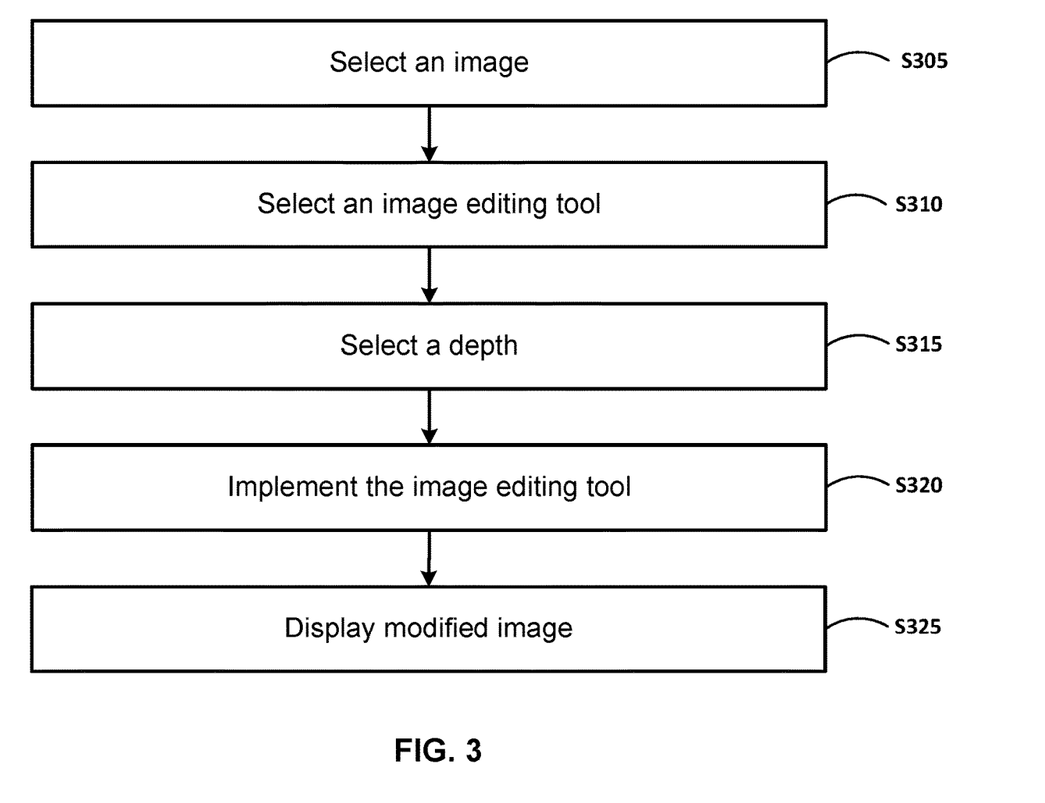
FIG. 3 illustrates a flowchart of a method for editing an image according to at least one example embodiment.
Figure 4:
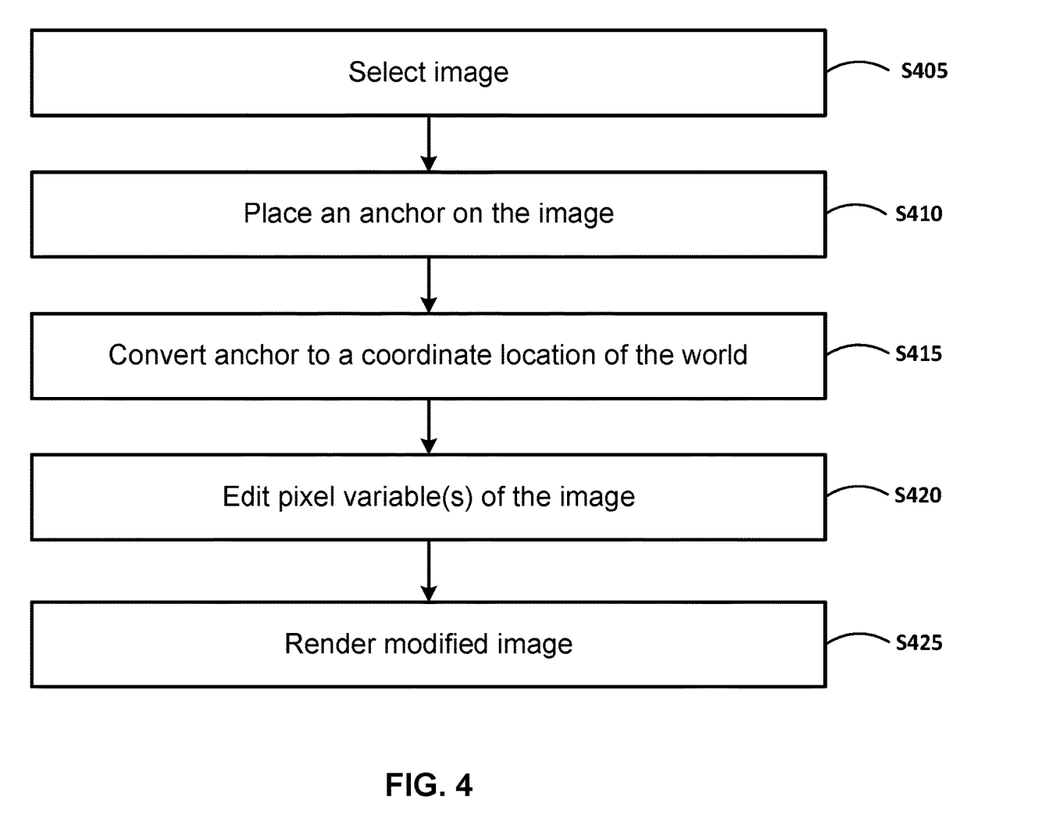
FIG. 4 illustrates a flowchart of a method for editing an image according to at least one example embodiment.

FIGS. 3 and 4 are flowcharts of methods according to example embodiments. The methods described with regard to FIGS. 3 and 4 may be performed due to the execution of software code stored in a memory (e.g., a non-transitory computer readable storage medium) associated with an apparatus and executed by at least one processor associated with the apparatus.

However, alternative embodiments are contemplated such as a system embodied as a special purpose processor. The special purpose processor can be a graphics processing unit (GPU). A GPU can be a component of a graphics card. The graphics card can also include video memory, random access memory digital-to-analogue converter (RAMDAC) and driver software. The video memory can be a frame buffer that stores digital data representing an image, a frame of a video, an object of an image, or scene of a frame. A RAMDAC can be configured to read the contents of the video memory, convert the content into an analogue RGB signal and sends analog signal to a display or monitor. The driver software can be the software code stored in the memory referred to above. The software code can be configured to implement the method described herein.

Although the methods described below are described as being executed by a processor and/or a special purpose processor, the methods are not necessarily executed by a same processor. In other words, at least one processor and/or at least one special purpose processor may execute the method described below with regard to FIGS. 3 and 4.

FIG. 3 illustrates a flowchart of a method for editing an image according to at least one example embodiment. As shown in FIG. 3, in step S305 an image is selected. The image can be selected from a memory associated with a device configured to edit the image. The image can be a frame of a video selected from a memory associated with a device configured to edit the video. The image can be selected as a preview image prior to an image being captured and stored to a device. The image can be selected as a preview image as a frame of a video being captured and stored to a device. In other words, the image or frame can be edited during a capture process (e.g., as a function of a camera application executing on the device). In an example implementation, the selected image includes depth information.

The depth information can include a depth map having a depth value for each pixel in an image. A depth map can be an image associated with a color (e.g., RGB, YUV, and/or the like) image or frame of a video. A depth map can be an image associated with a black and white, greyscale, and the like image or frame of a video. The depth map can store a distance value for each pixel in the image or frame. The depth value can have an 8-bit representation with values between, for example, 0 and 255, where 255 (or 0) represents the closest depth value and 0 (or 255) represents the most distant depth value. In an example implementation, the depth map can be normalized. For example, the depth map can be converted to a range of [0, 1]. Normalization can include converting the actual range of depth values. For example, if the depth map includes values between 43 and 203, 43 would be converted to 0, 203 would be converted to 1 and the remaining depth values would be converted to valued between 0 and 1.

A depth map can be generated by a camera including a depth (D) sensor. This type of camera is sometimes called an RGBD camera. A depth map can be generated using an algorithm implemented as a post-processing function of a camera while capturing an image or frame of a video. For example, an image can be generated from a plurality (e.g., 3, 6, 9 or more) images captured by a camera (e.g., a camera of a mobile device). The algorithm can be implemented in an application programming interface (API) associated with capturing real-world space images (e.g., for augmented reality applications).

In high dynamic range (HDR) image capture, a plurality of frames (e.g., 3, 6, 9 or more) can be blended into a single image. As a result, the camera can have the ability to average the plurality of frames to reduce noise that improves image quality. In addition, the camera can generate a depth map using the plurality of images because the images can be from different angles which can be compared to estimate the distance to every pixel. In some cases, the depth map can be more accurate as the device moves around a real-world space.

The depth information can be represented as a 3-D point cloud. In other words, a point cloud can be a depth map in three dimensions. A point cloud can be a collection of 3D points (X,Y,Z) that represent the external surface of the scene and can contain color information.

The depth information can include depth layers each having a number (e.g., an index number or z-index number) indicating a layer order. The depth information can be a layered depth image (LDI) having multiple ordered depths for each pixel in an image. Color information can be color (e.g., RGB, YUV, and/or the like) for each pixel in an image. A depth image can be an image where each pixel represents a distance from the camera location.

A Layered Depth Image (LDI) can be an image-base representation of a three-dimensional (3D) scene. An LDI can include a two-dimensional (2D) array or group of layered depth pixels. Each layered depth pixel can include a set of LDI samples sorted along one line of sight as viewed from a single camera position or perspective. The camera can be referred to as an LDI camera. Other ways of referring to an LDI sample can include, but are not limited to, a point, a depth pixel, or a layered depth pixel sample. For each LDI sample, a camera, referred to as a source camera, provides data associated with the LDI sample. A representation of a LDI pixel can include color information, alpha channel information, depth information (a distance between the pixel and the camera), an identifier for a source camera for an LDI sample (e.g., a number, a pointer or a reference to the camera), and other attributes that can support the rendering of the LDI in a three-dimensional (3D) space.

In step S310 an image editing tool is selected. For example, the user of the device can select an image processing action used to edit the image. The image processing action can be configured to cause the execution of an algorithm on the image. The algorithm can include, at least, image enhancement, image blur, image fog, image filter, image crop, image color change(s), image special effects, image warp and/or the like. In some implementations, the image processing action can cause the execute two or more algorithms on the image. For example, image enhancement can be performed on a portion (e.g., select pixels) of the image and image blur can be performed on another portion (e.g., select pixels) of the image.

In step S315 a depth is selected. For example, as mentioned above, the image can have associated depth information. The depth information can include a depth map, depth by pixel, layers, and/or the like. Therefore, selecting depth can include selecting a distance from a depth map, a distance from a pixel, a layer (e.g., z-index number), and/or the like. As discussed above, an anchor can be placed at a position on the image. The anchor can be placed on an object, the anchor can be placed at a depth, and/or the like. In an example implementation, the depth is selected based on the placement and/or position of the anchor.

In step S320 the image editing tool is executed. In an example implementation, the image editing tool is implemented based on the selected depth. For example, the algorithm can be executed on pixels of the image at the selected depth. Alternatively, or in addition, the algorithm can be executed on pixels of the image within a range of the selected depth. The range can be based on a threshold number of pixels (e.g., based on depth, closer and/or further away). The range can be a number of pixels based on a threshold distance from the depth. The range can be variable (e.g., varied using a slide bar). In some implementations, the image processing action (based on the selected image editing tool) can cause the execute two or more algorithms on the image. For example, image enhancement can be performed on a pixels of the image at the selected depth (or within a range of the selected depth) and image blur can be performed on the remainder of the pixels (or the remaining pixels) in the image.

In step S325 a modified image is displayed. For example, the image modified using the image editing tool can be displayed on the device (e.g., within a user interface of an application). In an example implementation, the image or frame can be edited during a capture process (e.g., as a function of a camera application executing on the device). Accordingly, the algorithm(s) can be executed on pixels of the image at the selected depth continually (e.g., every frame or every number of frames) and the modified image can be continually updated and displayed. In other words, image editing can include real-time depth-based image editing. In an implementation where the anchor places a focus or enhancement on an object, the anchored object can remain focused and/or enhanced as the device moves (e.g., changes a perspective). The user interface can give the user the option to modify image editing settings and select an option to take a snapshot of the display and save the image to a memory of the device.

FIG. 4 illustrates a flowchart of a method for editing an image according to at least one example embodiment. As shown in FIG. 4, in step S405 an image is selected. The image can be selected from a memory associated with a device configured to edit the image. The image can be a digital image obtained by means of digital photography. The image can be a frame of a video selected from a memory associated with a device configured to edit the video. The image can be selected as a preview image prior to an image being captured and stored to a device. The image can be selected as a preview image as a frame of a video being captured and stored to a device. In other words, the image or frame can be edited during a capture process (e.g., as a function of a camera application executing on the device). In this implementation, the image can be a live image of a real-world space.

In an example implementation, the selected image includes depth information. The depth information can include a depth map having a depth value for each pixel in an image. The depth information can be represented as a 3-D point cloud. In other words, a point cloud can be a depth map in three dimensions. The depth information can include depth layers each having a number (e.g., an index number or z-index number) indicating a layer order.

In step S410 an anchor (or virtual anchor) is placed on the image. For example, an anchor can be placed at a position on the image. The anchor can be placed on an object, the anchor can be placed at a depth, and/or the like. The anchor can be placed on the image via operation of a touch screen of the device. The anchor can be placed on the image via operation of a gesture detected by the device. In an implementation, the image can be a live image of a real-world space. Accordingly, the anchor can be placed on a real-world location within the live image of the real-world space.

In step S415 the anchor is converted to a coordinate location of the image. For example, the image can have a two-dimensional (2D) representation (e.g., x, y coordinates) based on the length and width of the display of the device (e.g., the screen-space). In other words, the anchor can be represented by a coordinate in the screen-space.

In step S425 pixel variable(s) of the image are edited. For example, as discussed above, the image can be edited using an algorithm. The algorithm can include, at least, image enhancement, image focus, image blur, image fog, image filter, image crop, image color change(s), image special effects, image warp and/or the like. For example, a per-pixel blurring according to the measured physical distance to the anchored point algorithm can be performed. Per-pixel blurring based on distance can include blurring pixels such that the more distance the pixel is from the anchor, the more blurry the pixel becomes in the rendered result. As mentioned above, the image can be a live image of a real-world space. Accordingly, the per-pixel blurring can simulate a depth-of-field effect on the device in real-time.

In step S430 a modified image is rendered. For example, the image modified based on depth can be rendered on a display of the device (e.g., within a user interface of an application). In an example implementation, the image or frame can be edited during a capture process (e.g., as a function of a camera application executing on the device). Accordingly, the algorithm(s) can be executed on pixels of the image at the selected depth continually (e.g., every frame or every number of frames) and the modified image can be continually updated and displayed. In other words, image editing can include real-time depth-based image editing.

In an example implementation, the image editing can be performed in a live image capture of a real-world space. Accordingly, as the device moves, the screen-space is recomputed, the depth map is regenerated, and the coordinates of the anchor are re-computed. The image is re-edited and rendered on the device. In other words, the technique described with regard to FIGS. 3 and 4 can continually repeat (e.g., execute in a loop). In an implementation where the anchor places a focus or enhancement on an object, the anchored object can remain focused and/or enhanced as the device moves. The user interface can give the user the option to modify image editing settings and select an option to take a snapshot of the display and save the image to a memory of the device.

Performing a fog effect as the image editing tool will be described in the context of FIG. 3 and/or 4 as an example use case. Using the user interface (e.g., as described with regards to FIG. 1 and/or FIG. 2) a user selects fog effect, sets a fog thickness, a fog distance and/or a fog color. A live image (e.g., RGB, YUV, and/or the like) and depth data (e.g., a depth map) of a real-world space in real-time are captured. A minimum (MIN) depth value and maximum (MAX) depth value can be determined from the depth map. The depth range can be normalized by converting the depth map to a range of [0, 1]. The anchor can be placed on, for example, an object in the live image of the real-world space.

In an example implementation, an anchor position in the screen-space is determined. The anchor position (or anchor positions) can be represented by an indication in the screen space. However, in an alternate, or additional, technique, anchor position (or anchor positions) can be stored based on, for example, a screen touch in the screen space. A depth of the anchor(s) can be requested (e.g., a function call to an API) and acquire the depth value associated with the screen coordinates of the anchor. The screen-space position of the anchor(s) can be converted to a real-world space position of the device. The real-world position of the anchor (e.g., the 3D position) can be stored to enable device movement without losing the anchor(s) position should the anchor position not be in the screen-space). Finally, the anchor position can be converted to a view-space position, the depth can be normalized based on a minimum (MIN) depth value and a maximum (MAX) depth value (e.g., can cause emphasis of the objects that are being focused on). Displaying data on a device having a two-dimensional (2D) display can include a mimicking 3D display by filtering (e.g., a Gaussian filter) 2D data to appear as 3D when rendered. This technique is sometimes called rendering as 2.5D RGBD data. Accordingly, the depth of field data can be rendered as 2.5D RGBD data.

The anchor depth position is determined and normalized. The normalized depth can be D_a=(d_a−MIN)/MAX−MIN), where d_a is the anchor depth and D_a is the normalized depth. Then each pixel is edited based on a fog effect algorithm. The fog effect algorithm can be, for each pixel, fog_factor=saturate ((−depth_value−fog_distance)/fog_thickness). An alternate fog effect algorithm can be, for each pixel, fog_factor=1.0−exp((−depth_value−fog_distance)*fog_thickness).

The display of the fogged live image can be to render a linear interpolation between the original (as captured by the camera) pixel color of the live image of the real-world space and a fog color by the fog_factor. Final_color=original color*(1−fog_factor)+fog_factor*fog_color. The resultant rendered image can be displayed on the device. The user interface can give the user the option to make fog effect changes and select an option to take a snapshot of the display and save the image to a memory of the device.

The listing (listing 1) below illustrates another use case as line code. The use case is an example anchored focus with an aperture effect.

---
Listing 1

Input : Depth map D, the camera image I, anchored 3D focal point f, and user-defined aperture value γ.
Output :Post-processed image O with aperture effects.
1  Compute the maximum $d_{max}$ and minimum $d_{min}$ of D.
2  For f, compute its corresponding screen-space point $p_f$.
3  Fetch the depth of the focal point f: $d_f \leftarrow D(p_f)$.

4  Compute its normalized depth $\hat{d}_f = \dfrac{d_f - d_{min}}{d_{max} - d_{min}}$.

5  for each image pixel p ∈ depth map D in parallel do
6  |  Sample p's depth value $d_p \leftarrow D(p)$.

7  |  Compute its normalized depth: $\hat{d}_p \leftarrow \dfrac{d_p - d_{min}}{d_{max} - d_{min}}$.

-continued

Listing 1

```
 8  |  Compute its distance to f: Δd ← |d̂_p − d̂_f|.
 9  |  Compute the "aperture size":
    |  σ ← step(0, Δd − α) · (1 − cos(β(Δd − α))), here
    |  α ← 0.1, β ← 3.
10  |  Compute the kernel size of the Gaussian filter:
    |  σ ← γ_0 + σ · γ, here γ_0 ← 0.1.
11  |  Apply a two-pass Gaussian filter with N-ring
    |  neighborhood in O(N) on the GPU, here N = 5.
12  end
```

Figure 5:
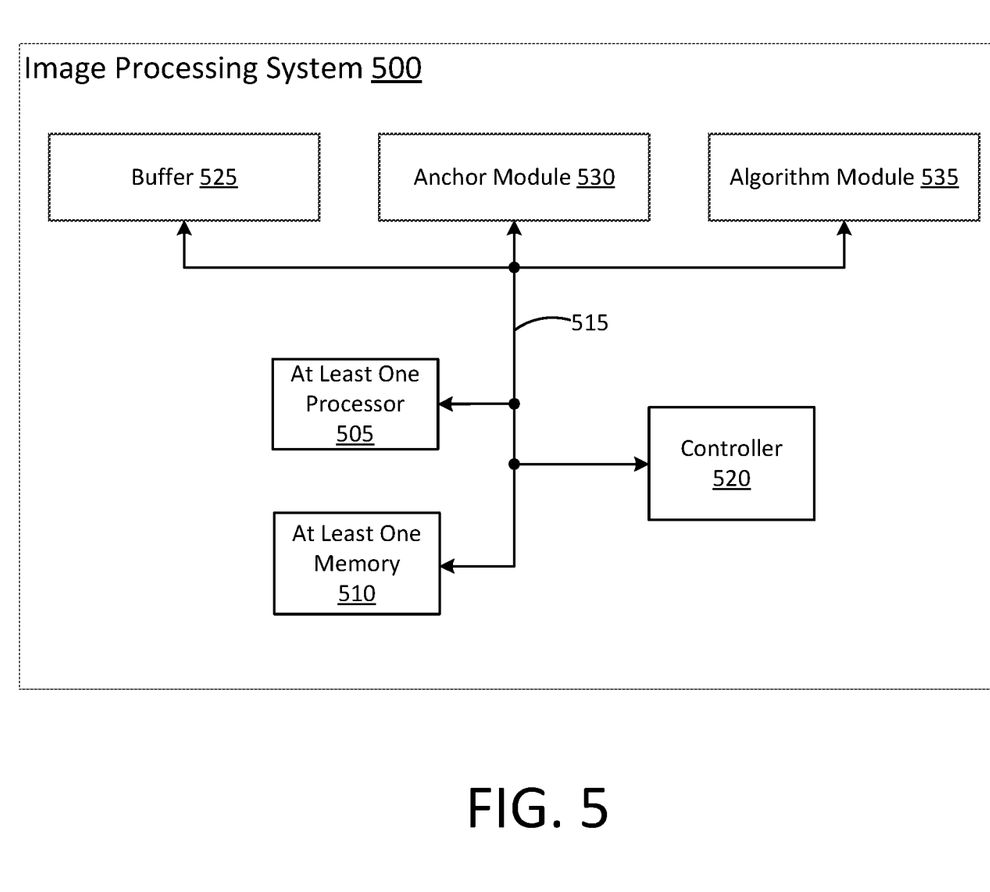
FIG. 5 illustrates a block diagram of an image processing system according to at least one example embodiment.

FIG. 5 illustrates a block diagram of an image processing system according to at least one example embodiment. As shown in FIG. 5, an image processing system 500 includes at least one processor 505, at least one memory 510, a controller 520, a buffer 525, an anchor module 530, and an algorithm module 535. The at least one processor 505, the at least one memory 510, the controller 520, the buffer 525, the anchor module 530 and the algorithm module 535 are communicatively coupled via bus 515.

The at least one processor 505 may be utilized to execute instructions stored on the at least one memory 510, so as to thereby implement the various features and functions described herein, or additional or alternative features and functions. The at least one processor 505 may be a general purpose processor. The at least one processor 505 may be a graphics processing unit (GPU). The at least one processor 505 and the at least one memory 510 may be utilized for various other purposes. In particular, the at least one memory 510 can represent an example of various types of memory and related hardware and software which might be used to implement any one of the modules described herein.

The at least one memory 510 may be configured to store data and/or information associated with the image processing system 500. For example, the at least one memory 510 may be configured to store code associated with implementing a user interface to capture and/or edit images. For example, the at least one memory 510 may be configured to store code associated with editing an image, a frame of a video, a preview image and/or the like. The at least one memory 510 may be a non-transitory computer readable medium with code that when executed by the processor 505 cause the processer 505 to implement one or more of the techniques described herein. The at least one memory 510 may be a shared resource. For example, the image processing system 500 may be an element of a larger system (e.g., a server, a personal computer, a mobile device, and the like). Therefore, the at least one memory 510 may be configured to store data and/or information associated with other elements (e.g., image/video serving, web browsing or wired/wireless communication) within the larger system.

The controller 520 may be configured to generate various control signals and communicate the control signals to various blocks in image processing system 500. The controller 520 may be configured to generate the control signals to implement the techniques described herein. The controller 520 may be configured to control the algorithm module 535 to modify pixels of an image, a portion of an image, a plurality of images, and the like according to example embodiments. For example, the controller 520 may generate control signals corresponding to parameters to implement image editing.

The algorithm module 535 may be configured to store algorithms for editing an image. The algorithm module 535 may be configured to cause the execution (e.g., using processor 505) of the algorithms for editing an image. The algorithm can include, at least, image (and/or object) enhancement, blur, fog, filter, edge highlighting, crop, color change(s), special effects, warp, and/or the like. Although a number image and/or object editing algorithms (or algorithm functions) are listed, implementations are not limited thereto. The buffer 525 can be a memory (e.g., a temporary or volatile memory) configured to store images before and/or after image editing. The buffer 525 can be a reserved portion of the at least one memory 510. Alternatively, or in addition to, the buffer 525 can be a standalone memory.

In some implementations, the anchor module 530 can be configured to (or help) place an anchor on an image, determine a position of an anchor in an image, determine a depth of an anchor in an image, determine a normalized depth of an anchor, determine an object at an anchor position in an image, and/or the like (e.g., other anchor functions described herein). In example implementations, the anchor module 530 and the algorithm module 535 together may be configured to implement the techniques described above with regard to FIGS. 1 to 4.

Figure 6:
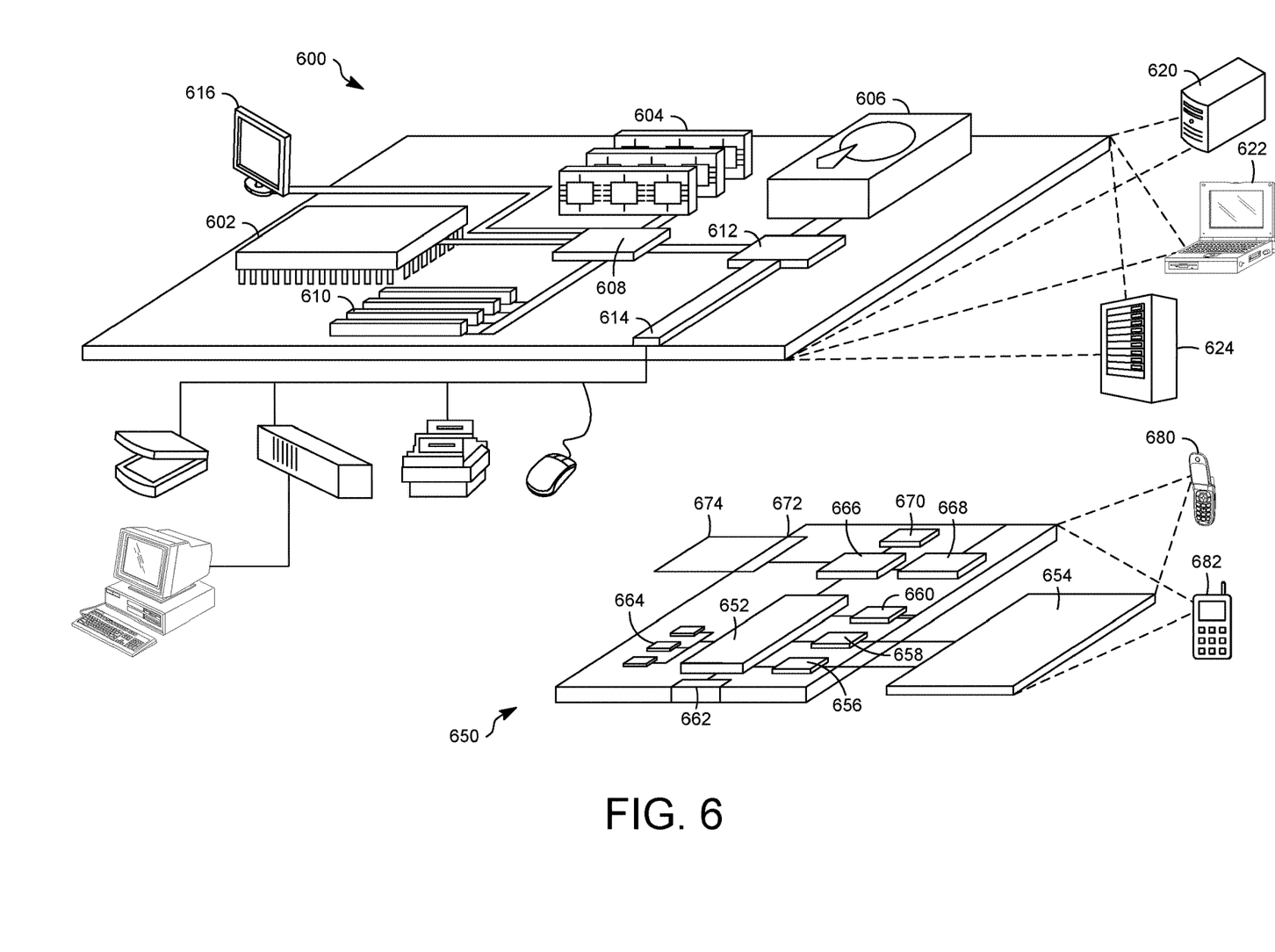
FIG. 6 shows an example of a computer device and a mobile computer device according to at least one example embodiment.

FIG. 6 shows an example of a computer device 600 and a mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high-speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, Wi-Fi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

In a general aspect, a device, a system, a non-transitory computer-readable medium (having stored thereon computer executable program code which can be executed on a computer system), and/or a method can perform a process with a method including receiving an image as a portion of a real-world space, placing an anchor on the image, determining a position of the anchor, determine a depth associated with the position of the anchor, applying an image editing algorithm based on the depth to the captured image, and rendering the edited image.

Implementations can include one or more of the following features. For example, the captured image can be a live image, the rendering of which is continually modified using the image editing algorithm based on the depth. The anchor can place a focus at a depth in the captured image, a perspective of the captured image can be changed, and the focus can remain on the depth. The applying of the image editing algorithm based on the depth to the captured image can include applying a first algorithm to a first portion of pixels including pixels of the captured image within a threshold distance of the depth, and applying a second algorithm to a second portion of pixels including the remaining pixels of the captured image.

For example, the applying of the image editing algorithm based on the depth to the captured image can include determining an object associated with the image, determine an edge of the object based on the depth, applying a first algorithm to a first portion of pixels including pixels of the captured image associated with the edge of the object, and applying a second algorithm to a second portion of pixels including the remaining pixels of the captured image. The determining of the depth associated with the position of the anchor can include acquiring a depth map associated with the captured image.

For example, the determining of the depth associated with the position of the anchor can include acquiring a depth map associated with the captured image, determining a minimum depth value associated with the captured image, determining a maximum depth value associated with the captured image, normalizing the depth map based on the minimum depth value and the maximum depth value, and determining the depth associated with the position as a normalized depth value. The determining of the depth associated with the position of the anchor includes acquiring layered depth associated with the captured image, and the depth of the anchor has a depth index number. The method can further include selecting an imaging editing tool, wherein the image editing tool corresponds to the image editing algorithm.

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method comprising:
   receiving an image as a portion of a real-world space at a device;
   placing an anchor on the image through operation of an interface of the device, the anchor being a virtual element;
   determining a position of the anchor on a display of the device, the position of the anchor being associated with a real-world location within a live image of the real-world space;
   determining a depth associated with the position of the anchor, the depth being based on a distance between a reference point and on a position of the device;
   generating an edited image by applying an algorithm configured to edit the image, the image editing algorithm being based on the depth; and
   rendering the edited image on a display of the device.

2. The method of claim 1, wherein the live image is continually modified using the algorithm.

3. The method of claim 1, wherein
   the anchor places a focus at a depth in the image,
   a perspective of the image is changed, and
   the focus remains on the depth.

4. The method of claim 1, wherein the applying of the algorithm to the image includes:
   applying a first algorithm to a first portion of pixels including pixels of the image within a threshold distance of the depth, and
   applying a second algorithm to a second portion of pixels including the remaining pixels of the image.

5. The method of claim 1, wherein the applying of the algorithm to the image includes:
   determining an object associated with the image,
   determine an edge of the object based on the depth,
   applying a first algorithm to a first portion of pixels including pixels of the image associated with the edge of the object, and
   applying a second algorithm to a second portion of pixels including the remaining pixels of the image.

6. The method of claim 1, wherein the determining of the depth associated with the position of the anchor includes acquiring a depth map associated with the image.

7. The method of claim 1, wherein the determining of the depth associated with the position of the anchor includes:
   acquiring a depth map associated with the image,
   determining a minimum depth value associated with the image,
   determining a maximum depth value associated with the image,
   normalizing the depth map based on the minimum depth value and the maximum depth value, and
   determining the depth associated with the position as a normalized depth value.

8. The method of claim 1, wherein the determining of the depth associated with the position of the anchor includes:
   acquiring layered depth associated with the image, and
   the depth of the anchor has a depth index number.

9. The method of claim 1, further comprising selecting an image editing tool, wherein the image editing tool corresponds to the algorithm.

10. A system comprising:
a memory storing a set of instructions; and
a processor configured to execute the set of instructions to cause the system to:
receive an image as a portion of a real-world space;
place an anchor on the image through operation of an interface of the device, the anchor being a virtual element;
determine a position of the anchor on a display of the device, the position of the anchor being associated with a real-world location within a live image of the real-world space;
determine a depth associated with the position of the anchor, the depth being based on a distance between a reference point and on a position of the system;
generate an edited image by applying an algorithm configured to edit the image, the image editing algorithm being based on the depth; and
render the edited image on a display of the device.

11. The system of claim 10, wherein the live image is continually modified using the algorithm.

12. The system of claim 10, wherein
the anchor places a focus at a depth in the image,
a perspective of the image is changed, and
the focus remains on the depth.

13. The system of claim 10, wherein
applying the algorithm to the image includes:
applying a first algorithm to a first portion of pixels including pixels of the image within a threshold distance of the depth, and
applying a second algorithm to a second portion of pixels including the remaining pixels of the image.

14. The system of claim 10, wherein
applying the algorithm to the image includes:
determining an object associated with the image,
determine an edge of the object based on the depth,
applying a first algorithm to a first portion of pixels including pixels of the image associated with the edge of the object, and
applying a second algorithm to a second portion of pixels including the remaining pixels of the image.

15. The system of claim 10, wherein the determining of the depth associated with the position of the anchor includes acquiring a depth map associated with the image.

16. The system of claim 10, wherein the determining of the depth associated with the position of the anchor includes:
acquiring a depth map associated with the image,
determining a minimum depth value associated with the image,
determining a maximum depth value associated with the image,
normalizing the depth map based on the minimum depth value and the maximum depth value, and
determining the depth associated with the position as a normalized depth value.

17. The system of claim 10, wherein the determining of the depth associated with the position of the anchor includes:
acquiring layered depth associated with the image, and
the depth of the anchor has a depth index number.

18. The system of claim 10, further comprising selecting an image editing tool, wherein the image editing tool corresponds to the image editing algorithm.

19. A device comprising:
a sensor configured to determine a real-world position of the device; and
a processor configured to execute a set of instructions to cause the device to:
render an image as a portion of a real-world space on a display of the device;
place an anchor on the image through operation of an interface of the device, the anchor being a virtual element;
determine a position of the anchor on the display of the device, the position of the anchor being associated with a real-world location within a live image of the real-world space;
determine a depth associated with the position of the anchor, the depth being based on a distance between a reference point and on a position of the device;
generate an edited image by applying an image editing algorithm to the image, the image editing algorithm being based on the depth; and
render the edited image on the display.

20. The device of claim 19 wherein the applying of the image editing algorithm to the image includes:
applying a first algorithm to a first portion of pixels including pixels of the image within a threshold distance of the depth, and
applying a second algorithm to a second portion of pixels including the remaining pixels of the image.

* * * * *